United States Patent [19]

Reinmold et al.

[11] Patent Number: 4,556,834
[45] Date of Patent: Dec. 3, 1985

[54] NUMERICALLY CONTROLLED PATTERN CUTTING MACHINE FOR GLASS PANES

[75] Inventors: Heinz-Josef Reinmold; Wilhelm Arnoldi, both of Aachen, Fed. Rep. of Germany

[73] Assignee: Saint-Gobain Vitrage, Courbevoie, France

[21] Appl. No.: 457,650

[22] Filed: Jan. 13, 1983

[30] Foreign Application Priority Data

Jan. 22, 1982 [DE] Fed. Rep. of Germany ....... 3201850

[51] Int. Cl.⁴ .............................................. G05B 19/18
[52] U.S. Cl. .................... 318/569; 318/632; 318/468
[58] Field of Search ................ 318/632, 572, 567–570, 318/468, 466–467, 590–591

[56] References Cited

U.S. PATENT DOCUMENTS

| | | | |
|---|---|---|---|
| 3,189,805 | 6/1965 | Poepsel | 318/572 X |
| 3,495,144 | 2/1970 | Elbling | 318/569 |
| 3,846,680 | 11/1974 | Guerci | 318/572 X |
| 3,896,361 | 7/1970 | Inaba | 318/632 |
| 4,031,445 | 6/1977 | Schmermund | 318/570 X |
| 4,171,657 | 1/1979 | Halberschmidt et al. | |
| 4,325,188 | 10/1982 | Reinmold et al. | |
| 4,352,050 | 9/1982 | Sakano | 318/632 X |

FOREIGN PATENT DOCUMENTS

| | | |
|---|---|---|
| 1596389 | 10/1961 | Fed. Rep. of Germany . |
| 2603167 | 1/1977 | Fed. Rep. of Germany . |
| 2731230 | 6/1978 | Fed. Rep. of Germany . |
| 2646062 | 8/1979 | Fed. Rep. of Germany . |
| 2850127 | 3/1982 | Fed. Rep. of Germany . |

*Primary Examiner*—B. Dobeck
*Assistant Examiner*—Patrick C. Keane
*Attorney, Agent, or Firm*—Pennie & Edmonds

[57] ABSTRACT

A system for control of movement of a cross sled which follows movement in an X-Y coordinate system according to a stored program, and for extending or shortening the path of movement either in the X-direction or Y-direction, or both directions.

6 Claims, 2 Drawing Figures

NUMERICALLY CONTROLLED PATTERN CUTTING MACHINE FOR GLASS PANES

DESCRIPTION

1. Technical Field

The invention relates to a system for control of movement of a sled of a numerically controlled machine along either or both of the X-Y coordinate axes for instance of a machine for cutting a glass pane. Each motor and drive shaft for driving the cross sled is controlled in a manner whereby a path of traverse of the cross sled according to a stored program along either or both coordinates may be extended or shortened.

2. Background of the Invention

German Pat. No. 26 46 062 relates to a numerically controlled pattern cutting machine having a motor and drive shaft for driving a cross sled along the X-Y coordinate axes for cutting a glass pane. This patent, more particularly, discloses that the drive shafts are each coupled to a rotor of an impulse generator and that signals developed by the impulse generator as a consequence of the position of the cross sled along the coordinates serve for comparison of a theoretical value with an actual value represented by that signal. The cutting machine or cross sled of the German patent, similar to other devices of the known prior art, is capable of movement in a manner predetermined by a program of movement stored, for example, on a magnetic tape or punched strip.

The cutting machine of the prior art suffers from the disadvantage that each stored program may be utilized to carry out one particular cut or cutting operation and no other. Thus, it has not been possible to cut a glass pane with a deviation in the length of the traverse of a cut along one coordinate or both coordinates. This is the case irrespective of whether the length of traverse of the cut is to be extended or shortened. This lack of flexibility in operation is a definite problem in the production or fabrication of cylindrically bent laminated glass panes. In this production, one of the individual glass panes connected with another glass pane on its convex side must be longer by several millimeters as determined by the bending radius of the base glass pane. Since there has been no capability in the prior art represented by the cutting machine of the German patent to modify the shape or contour of a cut in a glass pane from that of the stored program, the described manufacture must be completed partially in a non-automated fashion.

SUMMARY OF THE INVENTION

The invention which is particularly advantageous in a cutting machine for glass panes operative in response to a program control, seeks to overcome the disadvantage of the prior art described above. The invention, thus, provides a system capability of modification of a stored program of movement to either extend or shorten the length of traverse of a cross sled of the cutting machine. The change in the length of traverse is one that may be made deliberately and the change in the length of traverse may be carried out along one or both coordinate axes. Therefore, a single stored program will permit full automation in the production or fabrication of cylindrically bent laminated glass panes. In this production or fabrication one of the glass panes is cut in a manner dictated by the program, and the other glass pane is cut in a manner related to the program.

According to the invention, the housing of a pulse generator in the system control and mechanical drive of the cross sled, in at least one coordinate direction, is mounted rotatably relative to the rotor of the pulse generator. The rotor is driven rotationally by a motor providing the drive along that coordinate. The angular distance through which the rotor rotates is proportional to the speed of the drive motor.

One housing may be rotated either in the same or in a direction opposite to the direction of movement of the rotor. Thus, by measures generally described, and more particularly described below, it is possible to achieve a predetermined deviation in the positive or negative sense from a stored program. To this end, rotation of the housing will control the drive motor to the extent that the angular distance through which the rotor must rotate is extended or shortened and there is either an increase or decrease in the number of delivered impulses.

Additional features of the invention become clear as the description continues.

BEST MODE FOR CARRYING OUT THE INVENTION

Figure 1:
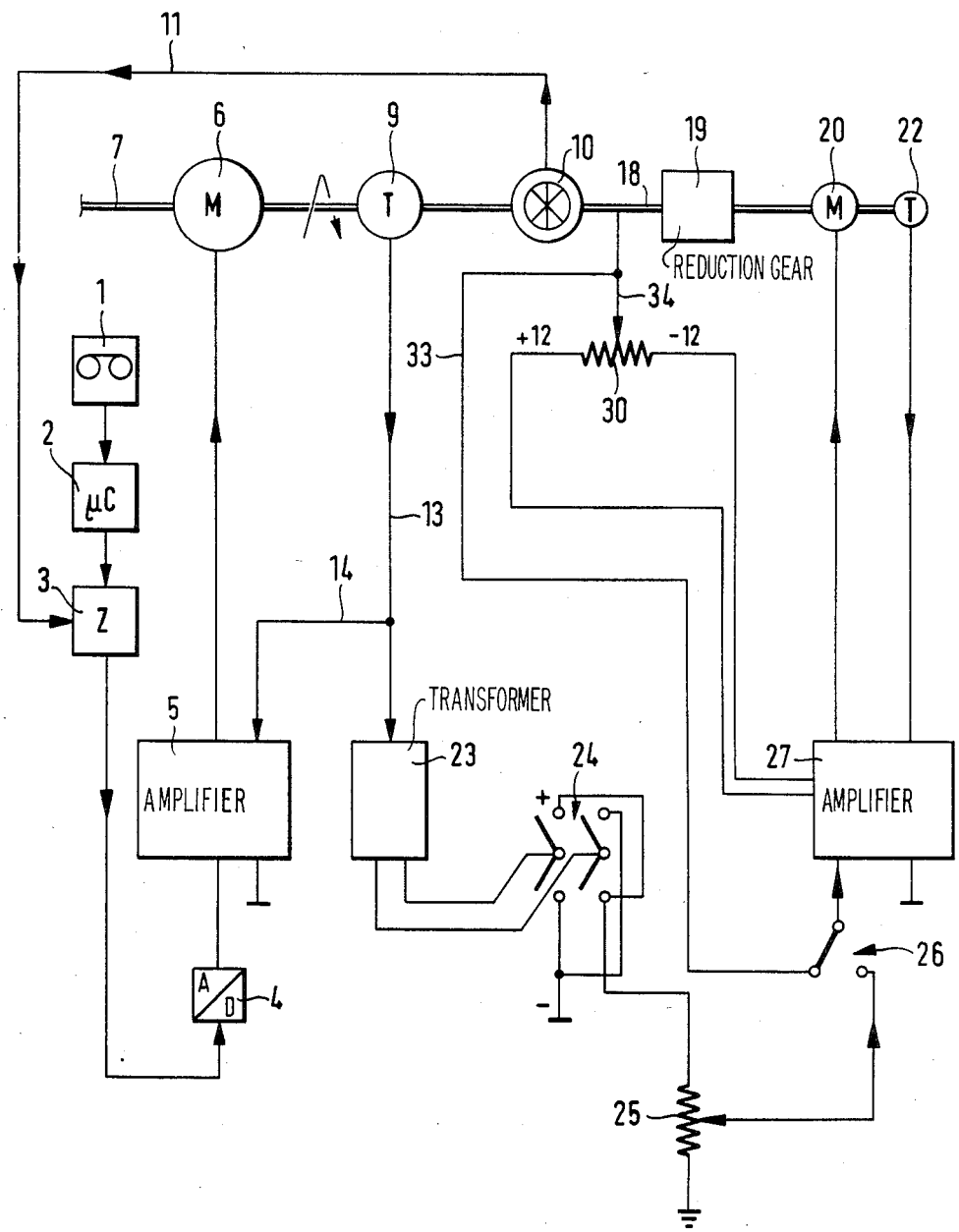
FIG. 1 is a block schematic illustration of the system of control of the invention.

The schematic illustration of FIG. 1 represents a path control system, and particularly a system having capability of control of a stored program of movement to either extend or shorten the length of traverse of a cross sled (not shown) supporting an operative tool (also not shown) along one or both of the X-Y coordinates relative to the length of traverse prescribed by a theoretical program. The tool, as heretofore described, may be a tool for cutting glass.

The system includes a storage 1 for a theoretical program in the control of movement of the cross sled of a program controlled cutting machine. The storage may be in the form of a magnetic tape, a punched strip or some other well-known program storage capability (hereinafter "magnetic tape").

Signals relating to the path of movement stored on the magnetic tape are processed by a microcomputer 2. To this end, the microcomputer processes each signal for each of the X-Y coordinates in the drive of the cross sled. The processed signals in the form of digital impulses are connected to an amplifier for regulating the signal for use in the drive of the cross sled along a coordinate (only one amplifier 5 is shown in the schematic presentation of FIG. 1). If system requirements are such that the cross sled is to be controlled to either extend or shorten the length of traverse of the cross sled along both of the coordinate axes, then the system components and structure to be described will be duplicated, as necessary, to control both an X-drive motor and a Y-drive motor.

In some circumstances it may be sufficient to control the cutting pattern along one coordinate axis, only. For example, in the cutting of two glass panes which later are to be processed by bending the glass panes and forming a laminate, control may be necessary along only one coordinate axis. Just as frequently, however, it is necessary to control the cutting pattern along both coordinate axes. In this manner the cutting around the entire periphery of the glass pane may be controlled. The term "control" is intended to include the capability to either extend or shorten the cutting pattern from a theoretical stored program so that the produced glass pane cut from a sheet, although of different dimension is related to the glass pane that otherwise would have been produced.

The processed signals from microcomputer 2 are connected to an amplifier 5 in a series connection through a difference counter 3 and an analog/digital converter 4. Amplifier 5 is a regulating amplifier for controlling a motor 6 and the rotary output of a drive shaft 7. As indicated, the motor may be the X-drive or Y-drive motor for driving the cross sled in one coordinate direction. The difference counter is of the type oftentimes referred to as a forward-backward difference counter.

An element 9 comprising a speedometer machine is mechanically coupled to drive shaft 7. A pulse generator 10, more particularly, the rotor of the pulse generator is also coupled mechanically to the drive shaft. Each drive is responsive to the instantaneous angular position of the drive shaft during operation of the control system.

The response is represented by a series of impulses developed by the pulse generator. The impulse signals representative of the rotation of the rotor are connected directly to difference counter 3 over line 11. The difference counter, thus, is able to compare an actual signal representative of an actual position with a theoretical signal representative of a theoretical position of the tool. The response of the speedometer machine 9 is that of a voltage output. The voltage output of the speedometer machine is connected directly to amplifier 5. The connection of the voltage output is completed by lines 13, 14. The voltage output, representing an actual control value, is series connected within the amplifier with the signal from the analog/digital converter 4. A differential voltage resulting from that series connection provides a control voltage for control of the drive motor 6.

The system arrangement as described above follows generally the disclosure in the aforementioned German patent, and reference may be had to that patent for further details.

The housing of pulse generator 10 (see FIG. 2) is mounted on a shaft 18. A mounting flange 17 connected to both the housing and shaft may be used for this purpose. This manner of mounting, thus, provides for movement of the housing through some rotational angle, in either direction, relative to the rotor of the pulse generator whose movement is proportional to and follows movement of drive shaft 7.

Figure 2:
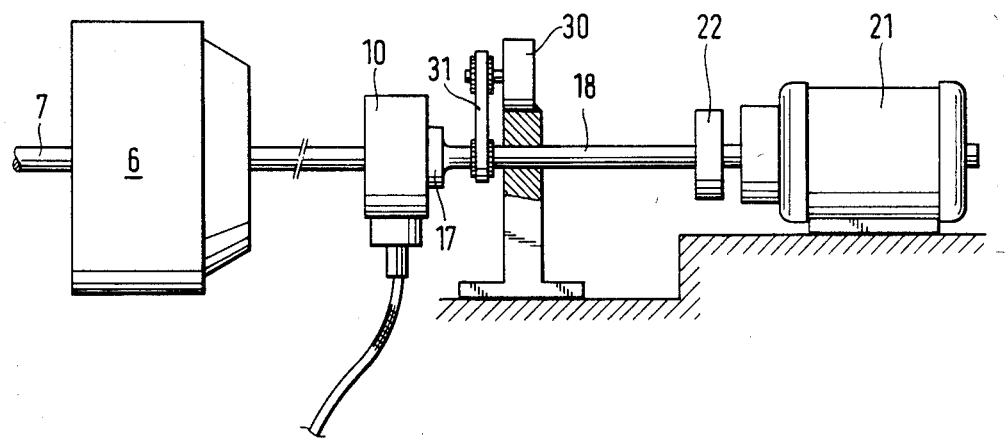
FIG. 2 is a schematic elevation of the mechanical system of control of a drive motor of the cutting machine.

Shaft 18 is connected to the output drive of motor 20. The connection is through a reducing gear ring 19 (see FIG. 1). Motor 20 may be a DC current motor and the motor together with the gear connection with shaft 18 is illustrated in FIG. 2 as motor 21.

A second element 22 comprising a speedometer machine is mechanically coupled to shaft 18. The speedometer machine is responsive to rotation of the shaft, and thus, the rotation of the housing of pulse generator 10. The speedometer machine develops a voltage output representative of the instantaneous angular position of the shaft 18 relative to a reference position. The voltage output is connected to an amplifier 27. The amplifier may be a regulating amplifier.

The input and angular movement imparted to the housing of pulse generator 10 by motor 21 will be proportional to the speed of motor 6 and the output represented by drive shaft 7.

The speedometer machine 9 heretofore was indicated as developing a voltage output representative of the instantaneous angular position of drive shaft 7. The voltage output of speedometer machine 9 in addition to connection with amplifier 5 is connected directly to a direct current transformer 23 for transforming an alternating current to direct current, and by circuitry to be described, functions to regulate the angular positioning of shaft 18 and the angle through which the housing of pulse generator 10 is rotated.

The direct current transformer 23 is connected to amplifier 27 through a circuit connection including a converter 24, a potentiometer 25 and a second converter 26. The speedometer machine 22 is also connected to the amplifier and the voltage output representative of an actual value of the regulating circuit provides a value for comparison with a theoretical value.

Converter 24 functions in a manner to change polarity of the regulating voltage from speedometer machine 9. This change in polarity will have the effect of changing the direction of rotation of the housing of pulse generator 10. By rotation of the housing of the pulse generator in the direction of movement of the rotor it is possible to extend the programmed traverse of the cross sled along a coordinate axis, and by rotation of the housing in the opposite direction it is possible to shorten the programmed traverse of the cross sled along that axis. Potentiometer 25 functions to provide a range of adjustment in control of movement. Position of adjustment is determined from case to case.

A potentiometer 30 is coupled to shaft 18. As perhaps best seen in FIG. 2, the potentiometer is a rotational potentiometer coupled to the shaft by a pair of gears and a belt 31. The potentiometer is coupled kinematically in a transmission ratio of 1:1.

Potentiometer 30 functions to provide a correction voltage in positioning of the housing of pulse generator 10 relative to a reference during periods of standstill. To this end, if the switching position of converter 26 is in the position illustrated in FIG. 1, the input to amplifier 27 will be the signal at junction 34 which represents the position of the tap of the potentiometer relative to the $+12$ and $-12$ volt terminals. The input is along line 33. If any drift in the driving system of motor 21 prior to commencement of the cutting process, or in the driving system of motor 21 is recognized prior to commencement of the cutting process, or in the event that motor 21 has not returned the housing of pulse generator 10 precisely to a start position, amplifier 27 will be connected either to a negative or positive voltage. This voltage then comprises a regulating voltage to return the housing of the pulse generator to the reference position at the conclusion of or prior to a cutting process.

During a cutting process the position of the switch of converter 26 will be reversed thereby to connect the input of amplifier 27 to potentiometer 25. The circuit of the system is suitably grounded and system components are connected to proper voltage levels for operation.

I claim:

1. A numerically controlled machine, particularly a pattern cutting machine for a glass pane, having capability of use in controlling movement of a cross sled and a supported cutting tool relative to said glass pane comprising
- (a) a drive motor including
  - (1) a drive motor output shaft adapted to be connected to said cross sled for driving said cross sled longitudinally along a first path in response to a drive signal representative of a theoretical program,
- (b) means connecting said drive motor to a source of said drive signal,
- (c) a pulse generator including
  - (1) a housing and
  - (2) a rotor within said housing, said rotor being connected to said drive motor output shaft for generating a signal which is representative of an actual position of said cross sled along said first path,
- (d) a control motor including
  - (1) a control motor output shaft, said control motor output shaft being connected to said housing and operative to rotate said housing relative to said rotor either in the direction of movement of said rotor or in the opposite direction,
- (e) means for comparing said actual position signal and set points of said drive signal, said comparison means located within said connection means, and
- (f) means for controlling said control motor and said control motor output shaft to rotate said housing of said pulse generator at a rate proportional to the rate of rotation of said drive motor output shaft and position said housing of said pulse generator relative to said rotor either to extend or shorten said cutting pattern 2. The machine of claim 1 wherein said means for controlling said control motor and said control motor output shaft includes a first speedometer machine, said first speedometer machine coupled to said drive motor output shaft for developing a voltage output representative of the instantaneous angular position of said drive motor output shaft.

3. The machine of claim 2 wherein said means for controlling said control motor and said control motor output shaft includes a converter for reversing polarity of said voltage output.

4. The machine of claim 2 wherein said means for controlling said control motor and said control motor output shaft includes a regulating amplifier for driving said control motor, and a potentiometer at the input of said regulating amplifier to control said input and adjust the output of said regulating amplifier and the length of movement of said cross sled along said first path.

5. The machine of claim 2 including a rotational potentiometer having a tap operatively connected to said control motor output shaft, circuit means connecting said rotational potentiometer to a source of power whereby said tap when said control motor output shaft is at an angular reference orientation is at ground potential, and wherein said means for driving said control motor includes a regulating amplifier, and circuit means connecting said regulating amplifier and tap whereby a voltage at said tap provides a voltage to return said output shaft to said reference orientation.

6. The machine of claim 1 including duplicate structure for driving said cross sled longitudinally along a second path perpendicular to said first path.

* * * * *